H. G. SHERER.
HOSE COUPLING.
APPLICATION FILED AUG. 5, 1912.

1,112,850.

Patented Oct. 6, 1914.
2 SHEETS—SHEET 1.

Witnesses:

Inventor:
Henry G. Sherer

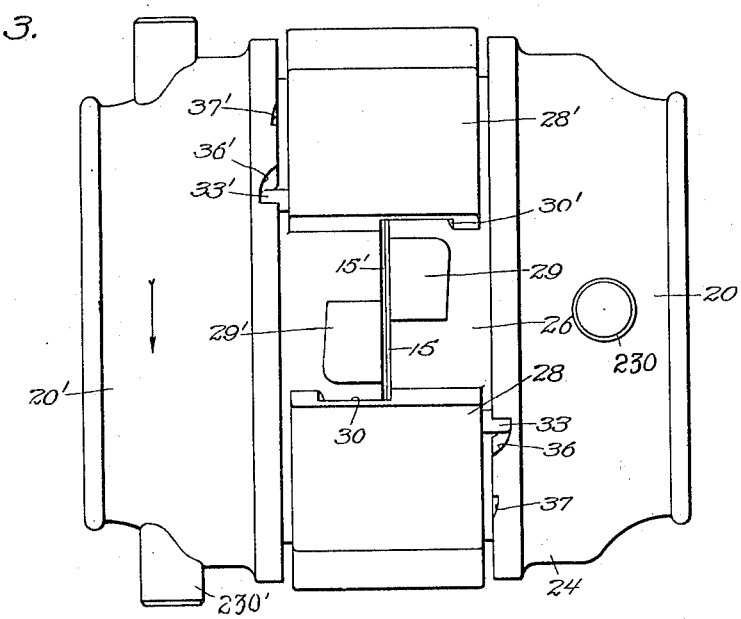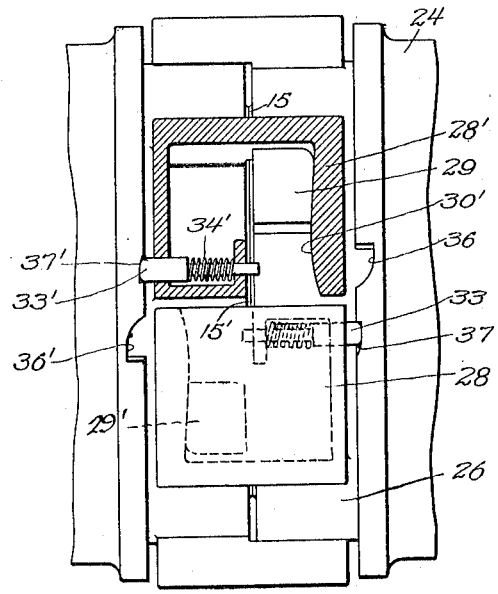

UNITED STATES PATENT OFFICE.

HENRY G. SHERER, OF WAUKEGAN, ILLINOIS.

HOSE-COUPLING.

1,112,850. Specification of Letters Patent. Patented Oct. 6, 1914.

Application filed August 5, 1912. Serial No. 713,224.

*To all whom it may concern:*

Be it known that I, HENRY G. SHERER, a citizen of the United States, residing at Waukegan, in the county of Lake and State of Illinois, have invented certain new and useful Improvements in Hose-Couplings, of which the following is a specification.

My invention relates to improvements in hose couplings, and has for its general object to provide a rugged, simple and efficient coupling structure operable easily and rapidly to effect connection or disconnection between the two hose lengths, and insuring a perfect union of the hose lengths when coupled.

Other and further objects of my invention will become apparent from the following description taken in connection with the accompanying drawings illustrating one practical embodiment of my invention.

Figure 1:
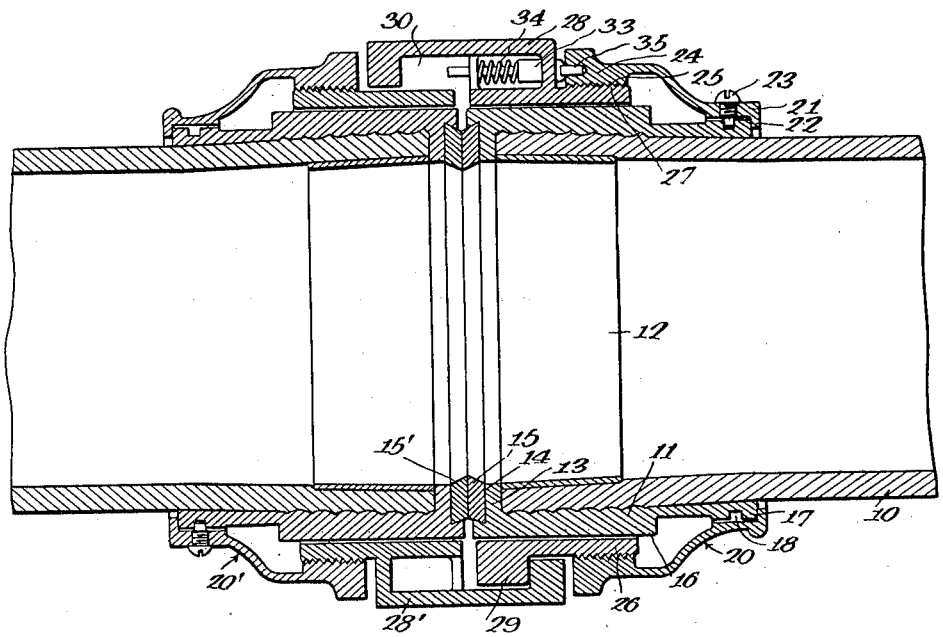
Figure 2:
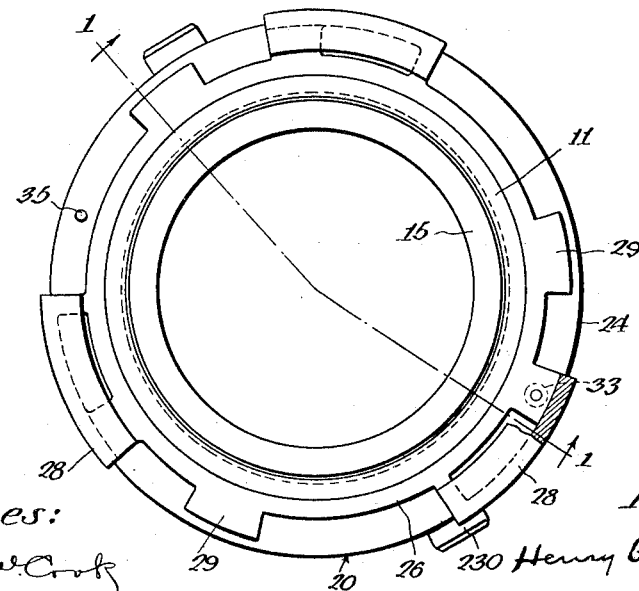

In the drawings Figure 1 is a longitudinal diametrical section of a coupling embodying my invention, cutting line 1—1 of Fig. 5; Fig. 2 is a longitudinal diametrical section, angularly separated from that of Fig. 1, and cutting line 2—2 of Fig. 5; Fig. 3 is a side elevation showing the two coupling members preliminarily engaged but unlocked; Fig. 4 is a detail showing a central fragment of the two members in a locked position intermediate the initial or unlocked position and the preferred final position; part of the structure being broken away to show a retaining latch.

In the embodiment of my invention I preferably employ on both ends of each hose section substantially duplicate coupling members. This is particularly advantageous in fire hose, in that it makes no difference which end of any hose section is presented for engagement with another hose section, and obviously the delays often incident to the selection of male and female coupling members appropriate for connection are avoided. In the drawings I have shown the two coupling members as exact duplicates and therefore I will describe but one of them, it being understood that the opposing member is exactly similar in construction with like parts indicated by like numerals of reference distinguished by the exponent character prime (').

In the drawings 10 indicates the hose section end secured within a sleeve 11 which I will term the "compression sleeve." The sleeve is preferably formed with a rearwardly tapered interior surface suitably grooved or otherwise prepared for engagement with the hose, and the hose is secured within the tapered surface by means of a tapering ring 12 and thereby securely fixed against detachment. The compression sleeve 11 has at its forward extremity beyond the end of the hose 10 an inturned lip 13 grooved as at 14, to receive a packing ring 15 projecting beyond the forward end of the sleeve. The packing ring 15 is preferably made of rubber and preferably has both its peripheral surfaces (or at least its inner peripheral surface) converging from the base of the ring to the forward surface thereof, so that when the two rings 15 and 15' meet they constitute an effective packing for the joint between the two hose members, and form a V-shaped crest or rib projecting into the water passage so that the water pressure from the inside of the hose may tend to force them into tighter contact as it exerts its outward pressure upon the crest of the compressible rings.

The outer surface of the sleeve 11 may be cylindrical throughout its forward portion 16 to form a bearing surface for an axially shiftable anchor member and at its rear extremity said sleeve preferably has a reduced bearing surface 17 provided with a circumferential groove 18.

Rotatable upon the sleeve 11 is a tension head or operating head, 20, having a throat portion 21 mounted for rotation upon the reduced bearing 17 of the sleeve and provided with an inturned flange 22 overlying the rear extremity of said sleeve thereby to prevent forward displacement of the head axially with respect to the sleeve, said throat portion 21 of the head preferably carrying a screw pin 23 engaging the circumferential groove 18 to assist in maintaining the two elements in proper engagement, and also carrying wrench receiving studs 230. The forward portion 24 of the head terminates considerably in the rear of the forward end of sleeve 11 and where it overlies the bearing portion 16 of the sleeve it is flared outwardly, spaced apart from said surface 16, and internally screw threaded as at 25.

With the "compression sleeve" 11 and "tension head" 20 there coöperates an anchor element 26 adapted to interlock with the corresponding element of the opposing coupler member, and then to act as the base with respect to which the head and sleeve move. Such member 26, in the construction shown, takes the form of a ring free for axial movement with respect to the cylindrical bearing surface 16 of the sleeve 11 and provided at one end with a threaded stem portion 27 for coöperation with the threads 25 of the operating head, the threads being made in appropriate direction for the operation hereinafter described which,—in the specific instance illustrated,—requires the portion 27 to have a right-handed thread.

The portion of the body 26 which projects beyond the head 20 is provided, broadly speaking, with means to interlock with the corresponding element of the opposing coupler member, and in the specific construction shown I provide upon the body 26, circumferentially slotted hooks 28 and fixed studs 29 for interlocking engagement with the corresponding studs 29' and hooks 28' respectively, of the opposing coupler member, the opposed interlocking bodies being preferably duplicates in construction. Each hook 28 is preferably in the form of a block cast integral with the body, projecting radially beyond the body and axially past the end of the body, so that the hook projections may slip readily over the ring-portion of the opposing anchor member. Each axial projection has on its underside a circumferential groove 30 open at one side edge only of the hook. As is shown in Fig. 4 the surplus material may be conveniently cored out, but in effect the preferred form of hook is simply a member projecting axially beyond the end of the anchor body and provided with a laterally-opening passage, tapered somewhat for some drawing action on the portion of the opposite anchor member engaged thereby. Each lug 29 is of a suitable size and shape readily to enter the tapered groove 30 of an opposing hook member, said lugs 29 as shown in Fig. 3 being slightly spaced apart from the nearest adjoining hook 28 (on the side of said hook toward the mouth of the opening 30) and spaced apart from the more-remote hook a distance greater than the circumferential width of a hook. Thus, as is shown in Fig. 3, the interlocking bodies may readily be interengaged, the projecting hooks on each body element passing through the larger spaces between the opposing hooks and lugs until each lug on one element faces the open channel in a contiguous hook of the opposite interlocking member; after which opposite rotative movement of the two members will obviously cause the respective lugs to enter the grooves of the opposing hooks.

As a refinement for increased efficiency, certainty, and ease of operation, I provide means to restrict and limit the rotative movement between each anchor body and its tension head and also to make positive, under certain conditions, the interlocking engagement of the opposing anchor members. To this end I provide in one of the hook members, 28, a latch member 33 in the form of a stem reciprocating axially in bearings provided therefor in the rear end of the hook member. The latch is provided with a spring 34 tending to press it constantly rearwardly and is of such length that when it bears against the front face-wall of the operating head 20 it is forced, against the tension of its spring 34, to a position where the front end of the latch projects into the passage 30. The relative rotative movement of the operating head 20 and the anchor body 26 is limited in one direction by the provision of a suitable pin 35 on the operating head in the path of movement of stem 33, and in the other direction by the provision of a suitably deep notch 36 in the front surface of said operating head, the notch 36 being of sufficient depth so that when the stem 33 seats therein the front end of said stem will be completely withdrawn from the passage 30. A shallower notch 37 is also provided in the head surface to form a latch recess in which the stem may seat without complete withdrawal from passage 30.

The operation of a device constructed as above described will be as follows: Since the coupling members are either substantial or exact duplicates either end of any hose length may be coupled with the free end of any preceding hose length. In each coupling member the operating head 20 and the anchoring body 26 stand normally in such relation that latch-stem 33 is seated in notch 36 so latching the two elements together for rotation in unison and in such position, further, that the compression sleeve 11 is withdrawn axially as far rearward with respect to the anchoring body 26 as the screw threads 25 and 27 can force it under the limited range of rotation permitted between the operating head 20 and anchoring body 26. With both coupling members having their elements standing in this normal position the two coupling members are brought into the preliminary position of engagement shown in Fig. 3, that is to say, the overhanging and projecting end of each hook 28 is passed through the larger space between a hook 28' and a lug 29' of the opposing coupler member. Then the two operating heads 20 and 20' are oppositely rotated in the direction shown by the arrows in Fig. 3, the anchoring bodies turning with them until the opposing lugs 29 and 29' seat, respectively, at the ends of the grooves, 30' and 30 respectively, of the respective hooks 28' and 28 after which no further relative rotation between the anchor bodies in that direction can take place, said anchor bodies being firmly interlocked against such further rotation and against axial displacement. Under these conditions the packing rings 15 and 15' are in contact but not under full compression. Rotation of the two operating heads 20 and 20' is then continued in the aforesaid direction with the result that notch 36 moves away from the head of stem 33 driving said stem forward so that its forward end projects into the channel 30 to lock the lug 29' in said passage against accidental withdrawal. Then after slightly further rotation the parts assume the position shown in Fig. 4, with the stems 33 and 33' seated in the respective shallow notches 37 and 37' and the parts are then in what I will term latched position, the notches 37 being only deep enough to prevent accidental backward rotation of the parts. In this position effective coupling and union of the hose members is had, for while the packing rings are not under maximum compression they are, in this position, in firm engagement, and owing to the crested shape of the compression rings and their relatively large surface presentation to each other water leakage past them is practically impossible. Under heavy water pressure the interiorly projecting crests of the packing rings are pressed outward, simply increasing the pressure between the coacting surfaces of the rings and thereby tending to make the joint self sealing. It is preferable, however, that rotation of the operating heads in the direction described be continued, and it will be manifest that since the interlocked anchor members cannot rotate, the rotation of the operating heads draws said heads forward through the action of threads 25 and 27, and the axial progression of the operating heads on the anchor members is transmitted to the compression sleeves, so that they move forward with respect to the anchor members, and by their advance increase the pressure upon the packing rings. When each operating head has reached its intended limit of rotation the pins 35—35' strike the latch stems 33—33' thereby positively stopping the rotative movement. In this position the coupling is completely engaged, and the union of its members is complete. To disengage the members, the operation above described is just reversed.

While I have herein described in some detail the particular embodiment of my invention which I have found to be advantageous it will be apparent to those skilled in the art that there may be numerous changes in the details of construction without departure from the spirit of my invention and within the scope of the appended claims.

What I claim is:

1. In a hose coupling, two anchor rings adapted to interlock, each providing lugs protruding outwardly from the normal annular surface of said ring near the edge thereof, and each further providing outwardly and forwardly extending members each having in its under side a recess open toward one lateral side thereof, the upper wall of each recessed member lying radially without the outer surface of each lug of the other ring whereby the lug may lie thereunder, each lug being annularly spaced from the adjacent recessed member a distance to receive a recessed member of the coacting anchor ring with its open side facing the lug, whereby relative rotation of the anchor rings so positioned draws each lug under, and covered by, the coacting recessed member.

2. In a hose coupling the combination of two coupling members each comprising an anchor ring having radially projecting lugs thereon and having laterally opening hooks projecting beyond the ends of said rings radially beyond the ends of the lugs for engagement with the lugs of the opposing member, and means carried by one of said members for restricting the opening of the said hook positively to prevent disengagement of said hook from its lug.

3. In a coupling, the combination with the hose ends, of duplicate coupling members each comprising in combination a compression sleeve secured to the hose end, a packing ring carried by the compression sleeve, an anchor ring mounted for axial movement relative to the compression sleeve and provided with parts to make engagement with the opposing anchor ring, an operating head rotatable relative to the anchor ring acting on the compression sleeve and anchor ring to change their axial relation to each other, and latch means for normally holding the anchor ring and head in predetermined rotative relation to the anchor ring, said latch means including a part movable into or out of the path of the parts of the anchor ring which make engagement with the opposing anchor ring.

4. In a coupling the combination with the hose ends, of duplicate coupling members each comprising in combination a compression sleeve secured to the hose end, a packing ring carried by the compression sleeve, an anchor member mounted for axial movement relative to the compression sleeve and provided with parts to make engagement with the opposing anchor member, an operating head acting on the compression sleeve and anchor member to change their axial relation to each other, and latching means automatically governed in its latching and unlatching movements by the operating head for positively locking said anchor members against disengagement from each other.

5. In a hose the combination of duplicate coupling members each comprising an anchor ring having radial lugs thereon and laterally opened hooks projecting from the forward end thereof radially and axially beyond the rings for engagement with lugs of the opposite anchor ring structure, a compression sleeve slidable axially within the anchor ring, packing means carried by the end of the compression sleeve, an operating head coöperating with the compression sleeve and its anchor ring movable to force the compression sleeve forward with reference to its anchor ring, and means for restricting the hook-opening after the hook has engaged an opposing lug, to lock the rings against disengagement.

6. In a hose the combination of duplicate coupling members each comprising an anchor ring having laterally opened hooks projecting from the forward end thereof radially and axially beyond the rings for engagement with portions of the opposite anchor ring structure, a compression sleeve slidable axially within the anchor rings, packing means carried by the ends of each compression sleeve, means coöperating with each compression sleeve for forcing it forward with reference to the anchor ring, and means for positively locking the anchor rings in engagement with each other.

7. In a hose coupling, the combination of relatively movable tension members, coupling members carried thereby providing parts interengageable upon relative movement of the tension members, and means carried thereby operable upon further relative rotation of the tension members to lock said parts in interengaging position, said means comprising a movable part automatically returned to unlocking position upon return of said tension members from said further rotation to unlocked but interengaging position.

8. In a hose coupling, the combination of relatively movable tension members, coupling members carried thereby providing parts interengageable upon relative movement of the tension members, means carried thereby operable upon further relative movement of the tension members to lock said parts in interengaging position, packing means, and means to compress said packing means operable upon still further relative movement of said tension members.

In testimony whereof I hereunto set my hand in the presence of two witnesses.

HENRY G. SHERER.

In the presence of—
THOMAS HATTON,
CONRAD S. SHERER.

Copies of this patent may be obtained for five cents each, by addressing the "Commissioner of Patents, Washington, D. C."